US011858716B2

(12) United States Patent
Wiedemann

(10) Patent No.: US 11,858,716 B2
(45) Date of Patent: Jan. 2, 2024

(54) SUPPORT STRUCTURE HAVING VARYING INNER DIAMETER FOR PRESSING A MULTI-COMPONENT COMPOSITION OUT OF A COAXIAL CARTRIDGE WITHOUT RESTORING FORCE

(71) Applicant: Hilti Aktiengesellschaft, Schaan (LI)

(72) Inventor: Michael Wiedemann, Koenigsbrunn (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 17/933,263

(22) Filed: Sep. 19, 2022

(65) Prior Publication Data

US 2023/0089731 A1 Mar. 23, 2023

(30) Foreign Application Priority Data

Sep. 21, 2021 (EP) .................................... 21197870

(51) Int. Cl.
*B65D 81/32* (2006.01)
*B05C 17/005* (2006.01)

(52) U.S. Cl.
CPC ...... *B65D 81/325* (2013.01); *B05C 17/00559* (2013.01)

(58) Field of Classification Search
CPC ............ B65D 81/325; B05C 17/00559; B05C 17/00596
See application file for complete search history.

(56) References Cited

U.S. PATENT DOCUMENTS

| | | | | |
|---|---|---|---|---|
| 2006/0151530 | A1* | 7/2006 | Horner | B65D 81/325 222/137 |
| 2010/0108709 | A1 | 5/2010 | Frey | |
| 2010/0206904 | A1* | 8/2010 | Staub | B05C 17/00553 222/137 |
| 2023/0089731 | A1* | 3/2023 | Wiedemann | B05C 17/00596 |

FOREIGN PATENT DOCUMENTS

| | | | | |
|---|---|---|---|---|
| DE | 19618693 | A1 * | 11/1997 | B01F 13/002 |
| EP | 0105181 | A2 * | 4/1984 | |
| ES | 2072222 | A2 * | 7/1995 | |
| FR | 2501080 | | 9/1982 | |

* cited by examiner

*Primary Examiner* — Bob Zadeh
(74) *Attorney, Agent, or Firm* — Grüneberg and Myers PLLC

(57) ABSTRACT

A system for storing and dispensing a flowable multi-component composition contains a coaxial cartridge and a support structure. The coaxial cartridge has a hollow-cylindrical inner wall, a outer wall arranged coaxially around the inner wall, an inner chamber for a first component that is delimited radially by the inner wall, an outer chamber for a second component that lies radially between the inner wall and outer wall, and a front wall which firmly closes the two chambers on an end face of the cartridge and has a dispensing opening in each chamber. The support structure is designed to receive and hold the cartridge, and has a side wall shaped like a tube portion. An inner diameter of the side wall is varied or can be adjusted in the axial and/or radial direction of the support structure, adjusted when the cartridge is inserted and removed, or adjusted during the pressing-out process.

16 Claims, 11 Drawing Sheets

3
16a
16
17a
17
16b
17b
13
13
14
17

1
2
3
4
5
8
9
10
11
13
15
24
25
26
28
29
31
32
A
F

SUPPORT STRUCTURE HAVING VARYING INNER DIAMETER FOR PRESSING A MULTI-COMPONENT COMPOSITION OUT OF A COAXIAL CARTRIDGE WITHOUT RESTORING FORCE

CROSS-REFERENCE TO RELATED APPLICATIONS

This application claims priority to European Application No. 21197870.5, filed on Sep. 21, 2021, the content of which is hereby incorporated by reference in its entirety.

BACKGROUND OF THE INVENTION

Field of the Invention

The invention relates to a system for storing and dispensing a flowable multi-component composition. Said system comprises a coaxial cartridge which is designed to receive and store a first and a second component of the composition in separate coaxial chambers, as well as a suitable support structure into which this cartridge is to be inserted in order to press out the composition from said cartridge. Even if the explanation of the invention here usually only mentions the two coaxial chambers for two components, further (partial) chambers for other components of the multi-component composition can always be provided inside the cartridge.

Description of Related Art

The prior art discloses various cartridge designs for receiving at least two components of flowable compositions in separate chambers that can be dispensed using a pressing-out apparatus. With regard to the arrangement of the chambers, a distinction is made between coaxial cartridges and cartridges or foil packs having individual cartridges or foil bags arranged next to one another for the various components of a multi-component composition. The multi-component composition can be, for example, a sealing or fastening composition such as mortar, adhesive and much more.

In order to ensure a high, constant mixing quality of the two composition components to be dispensed, suitable support structures for the cartridges into which the cartridges for the pressing-out process are inserted are to be used in most cases. During the pressing-out process, these support structures absorb the pressures of the cartridges and prevent elastic expansion of the cartridges, which are mostly made of plastics material and would therefore yield to a high pressure during the pressing-out process without the support structure.

Thick-walled coaxial cartridges made of plastics material generally only show elastic expansion in the outer wall of the cartridge during the pressing-out process due to an almost equally high pressure in both chambers and an overpressure compared to the atmospheric pressure prevailing outside the cartridge. This can lead to undesired pumping behavior of the cartridge, which leads to mixing problems and a corresponding lack of hardening behavior of the composition.

When the outer wall of a thick-walled plastics cartridge elastically expands radially during the pressing-out process, restoring forces occur in said cartridge. When the pressing-out process is interrupted, for example when moving to the next borehole if a plurality of boreholes are to be filled with the contents of the cartridge in a row, this can lead to uneven pumping behavior in the cartridge, which is caused by the elastic restoring forces mentioned. The pressure in the outer chamber of the cartridge is relieved after an interrupted pressing-out process either by the components contained therein flowing out through the cartridge outlet or by relieving the pressure on the outer piston arranged in this chamber. This creates a piston offset in relation to the inner chamber, which leads to corresponding mixing problems during the subsequent pressing-out process.

To remedy this, a suitable support structure is to be used, which can prevent elastic deformation of the cartridge outer wall during the pressing-out process. This support structure would have to be as close as possible to the cartridge in order to limit the possible pumping volume to a minimum. During pumping behavior, the outer piston can only move back corresponding to the volume of a possible annular gap between the support structure and the cartridge outer wall because the cartridge outer wall could only expand elastically within this annular gap during the pressing-out process. It is also important to ensure that the support structure is sufficiently rigid in order to avoid pumping due to deformation of the support structure itself.

Identical diameters (i.e., the inner diameter of the support structure is the same as the outer diameter of the cartridge) therefore offer the greatest possible protection against disruptive pumping behavior and the associated mixing disruption of the pressed-out composition. However, identical diameters prevent easy insertion and removal of the cartridge into/from the support structure. Therefore, this requires a slightly larger inner diameter of the support structure compared to the outer diameter of the cartridge, i.e., the above-mentioned annular gap between the cartridge and the support structure that promotes the disruptive pumping behavior. Pumping is a major challenge, especially with large-volume cartridges and containers.

SUMMARY OF THE INVENTION

The problem addressed by the present invention is therefore that of providing a system consisting of a coaxial cartridge of the type mentioned at the outset, and a suitable support structure into which the cartridge is to be inserted for pressing out the multi-component composition, by means of which system both easy insertion/removal of the cartridge is possible and disturbing pumping behavior of the cartridge due to elastic restoring forces during the pressing-out process can be prevented.

This problem is solved by a system according to the description below. Preferred embodiments are also specified in the description below.

The invention also includes the following embodiments:

1. System (1) for storing and dispensing a flowable multi-component composition, comprising:
   - a coaxial cartridge (2) having a hollow-cylindrical cartridge inner wall (4), and a cartridge outer wall (5) which is arranged coaxially around said inner wall and is cylindrical at least on the inside, and having an inner chamber (6) for a first component that is delimited radially by the cartridge inner wall (4), and an outer chamber (7) for a second component of the composition that lies radially between the cartridge inner wall (4) and the cartridge outer wall (5), as well as having a cartridge front wall (8) which firmly closes the two chambers (6, 7) on an end face of the cartridge (2) and has a dispensing opening in each chamber; and
   - a support structure (3) which is designed to receive and hold the cartridge (2) when the composition is pressed out of said cartridge and for this purpose has a side wall (13) which is shaped at least partly like a tube portion and is at least partly closed on its first end face by a support structure front wall (15) designed to support the cartridge front wall (8);

wherein an inner diameter of the side wall (13) is varied or can be adjusted in the axial and/or radial direction of the support structure (3) in such a way that an annular gap (12) between the cartridge outer wall (5) and the side wall (13) is created or can be adjusted when the cartridge (2) is inserted into and removed from the support structure (3), and a tight fit of the side wall (13) against the cartridge outer wall (5) is created or can be adjusted over the duration of a pressing-out process.

2. System (1) according to embodiment 1, wherein the cartridge (2) also has an inner piston (10) which closes the inner chamber (6) at the rear and can be moved axially in said inner chamber, and an outer piston (11) which closes the outer chamber (7) at the rear and can be moved axially in said outer chamber; and the inner piston (10) is designed to press the first component out of the inner chamber (6) and the outer piston (11) is designed to press the second component out of the outer chamber (7) by means of simultaneous axial movement of the two pistons (10, 11) toward the cartridge front wall (8) in the support structure (3).

3. System (1) according to either embodiment 1 or embodiment 2, wherein the cartridge outer wall (5) is also cylindrical on the outside;

the side wall (13) of the support structure (3) is designed as a cylindrical tube which is slit in the axial direction; and the support structure (3) has an externally operable closing and opening mechanism for this slit (14) such that, when the slit (14) is open, the tube is larger than an outer diameter of the cartridge outer wall (5) by a predetermined annular gap which is twice the width, while, when the slit (14) is closed, the tube fits tightly against the cartridge outer wall (5).

4. System (1) according to embodiment 3, wherein the closing and opening mechanism for the slit (14) is designed as a wedge system, comprising:

an axially slit inner wedge (16) consisting of two wedge halves (16*a*, 16*b*) which are attached on the outside to the tube on both sides of its slit (14) and taper in the axial direction of the tube; and an outer wedge (17) which encloses the inner wedge (16) on the outside, can be shifted axially on said inner wedge and has two opposite wedge-shaped inner flanks (17*a*, 17*b*) which face the inner wedge (16) and, when the outer wedge (17) is axially shifted in one direction, push the two wedge halves (16*a*, 16*b*) of the inner wedge (16) toward one another in the circumferential direction until the slit (14) in the tube closes as a result, while axially shifting the outer wedge (17) in the other direction allows the inner wedge (16), and with it the slit (14) in the tube, to open again.

5. System (1) according to either embodiment 3 or embodiment 4, wherein the support structure (3) has an integrated cover which can be adjusted between an open state, which is designed for inserting the cartridge (2) into the support structure (3) and for removing the cartridge (2) from the support structure (3), and a closed state, which is designed for holding the cartridge (2) in the support structure (3) and for carrying out a pressing-out process; and the closing and opening mechanism for the slit (14) is mechanically coupled to the cover such that when the cover is open, the slit (14) is also open and when the cover is closed, the slit (14) is also closed.

6. System (1) according to either embodiment 1 or embodiment 2, wherein the cartridge outer wall (5) is conical on the outside and tapers toward the cartridge front wall (8) at a predetermined cone gradient; and the side wall (13) of the support structure (3) tapers conically on the inside toward the support structure front wall (15) at the same cone gradient as the cartridge outer wall (5) and has the same inner diameter on the support structure front wall (15) as an outer diameter of the cartridge outer wall (5) on the cartridge front wall (8);

such that while the cartridge (2) is inserted into the support structure (3), there is an annular gap (12) between the cartridge outer wall (5) and the side wall (13) that only closes completely when the cartridge front wall (8) hits the support structure front wall (15).

7. System (1) according to embodiment 6, wherein the support structure (3) can be opened and closed again along an axial dividing line (18) in its side wall (13) to remove the cartridge (2) inserted therein, by said support structure having two side wall segments (13*a*, 13*b*) which can be reversibly separated from one another along this axial dividing line (18) and are rotatably connected to one another along an axial connecting line (19) that is circumferentially apart from the dividing line (18).

8. System (1) according to either embodiment 1 or embodiment 2, wherein the cartridge outer wall (5) is conical on the outside and widens toward the cartridge front wall (8) at a predetermined cone gradient;

the support structure front wall (15) is designed as a reversibly closable cover for opening the support structure (3) to insert the cartridge (2) via the first end face of the support structure (3) and for closing the support structure (3) for the duration of a pressing-out process;

the side wall (13) of the support structure (3) is composed of a cylindrical outer tube (21) and an inner tube (20) which is inserted into said outer tube and mounted in an axially shiftable manner therein;

the inner tube (20) widens conically on the inside toward the support structure front wall (15) at the same cone gradient as the cartridge outer wall (5) and has the same inner diameter on the support structure front wall (15) as an outer diameter of the cartridge outer wall (5) on the cartridge front wall (8); and the support structure (3) has an axial pressure device (30) on its second end face that is designed to press the inner tube (20) against the closed cover.

9. System (1) according to either embodiment 1 or embodiment 2, wherein the cartridge outer wall (5) is also cylindrical on the outside;

the side wall (13) of the support structure (3) is composed of an outer tube (22) which tapers conically on the inside toward the support structure front wall (15) at a predetermined cone gradient, and an inner tube (23) which is mounted in an axially shiftable manner in said outer tube, is cylindrical on the inside and is axially slit multiple times to vary its diameter;

the inner tube tapers conically on the outside toward the support structure front wall (15) at the same cone gradient as the outer tube (22) and, when said inner tube rests against the support structure front wall (15), said inner tube has completely closed slits and the same inner diameter as an outer diameter of the cartridge outer wall (5); and the support structure (3) has an axial pressure device (30) on its second end face that is designed to press the inner tube (23) against the support structure front wall (15).

10. System (1) according embodiment 9 when dependent on embodiment 2, wherein the inner tube (23) has carrier hooks (24) on the second end face of the support structure (3) that project radially inward and are arranged axially behind the outer piston (11) of the cartridge (2) inserted in the support structure (3);

such that the outer piston (11), when it is pulled back after the pressing-out process to remove the cartridge (2), takes the inner tube (23) of the support structure (3) with it by means of its carrier hooks (24) and pulls said inner tube out of the outer tube (22), as a result of which the slits of the inner tube (23) open at the same time and an annular gap (12) forms between the cartridge outer wall (5) and the side wall (13) of the support structure (3).

11. System (1) according to either embodiment 1 or embodiment 2, wherein the cartridge outer wall (5) is also cylindrical on the outside:

the side wall (13) of the support structure (3) is composed of a cylindrical outer tube (31), a plurality of outer rings (27) which are each mounted in said outer tube in an axially shiftable manner, each taper in axial cross section in a trapezoidal or triangular shape toward the cylinder axis (A) and each rest with their broad sides (29) against an inside of the outer tube (31), as well as a plurality of inner rings (25) which are each arranged alternately with the outer rings (27) in the axial direction, partly project radially between the outer rings (27) and each widen in axial cross section in a trapezoidal or triangular shape toward the cylinder axis (A);

each inner ring (25) has a plurality of radial incisions (33) distributed over its circumference to change its diameter such that said inner ring can be pressed radially inward by axially pushing together the adjacent outer rings (27) and, as a result, the inner diameter of said inner ring can be reduced to be equal to the outer diameter of the cartridge outer wall (5) so that said inner ring is pressed against the outer wall (5) of the cartridge (2) inserted in the support structure (3); and the support structure (3) has an axial pressure device (30) on its second end face that is designed for axially pushing the outer rings (27) together toward the support structure front wall (15).

12. System (1) according to embodiment 11, wherein the inner rings (25) on their broad inner sides (32) facing the cartridge (2) coincide geometrically with the geometry of the cartridge outer wall (5) and are geometrically designed for said interaction with the outer rings (27) in such a way that said inner rings, when they rest against the cartridge outer wall (5), completely cover said cartridge outer wall and, as a result, support it radially over the entire surface during the pressing-out process.

13. System (1) according to either embodiment 1 or embodiment 2, wherein the cartridge outer wall (5) is also cylindrical on the outside;

the side wall (13) of the support structure (3) is composed of a cylindrical outer tube (31) and a hydraulic cushion (34) which rests, on the inside, on the outer tube (31) over its entire radial circumference and also at least partly on the support structure front wall (15) and is filled with a flowable medium;

the hydraulic cushion (34) is designed and dimensioned in such a way that when the cartridge (2) is inserted in the support structure (3), said hydraulic cushion encloses the entire outer wall (5) of said cartridge and at least part of the cartridge front wall (8), wherein its inner diameter, in its unloaded state which prevails before and during the insertion of the cartridge (2) into the support structure (3), is larger than an outer diameter of the cartridge outer wall (5) by a predetermined annular gap which is twice the width, whereas, in its loaded state which occurs at the start of a pressing-out process and the associated pressing of the cartridge outer wall (5) against the support structure front wall (15), the cushion (34) comes to fit tightly against the entire cartridge outer wall (5) due to the immediate escape of the flowable medium from its front wall portion (35) into its side wall portion (36).

14. System (1) according to embodiment 13, wherein the flowable medium is incompressible at least at pressures which can be reached during a pressing-out process in the system (1).

DETAILED DESCRIPTION OF THE INVENTION

Figure 1:
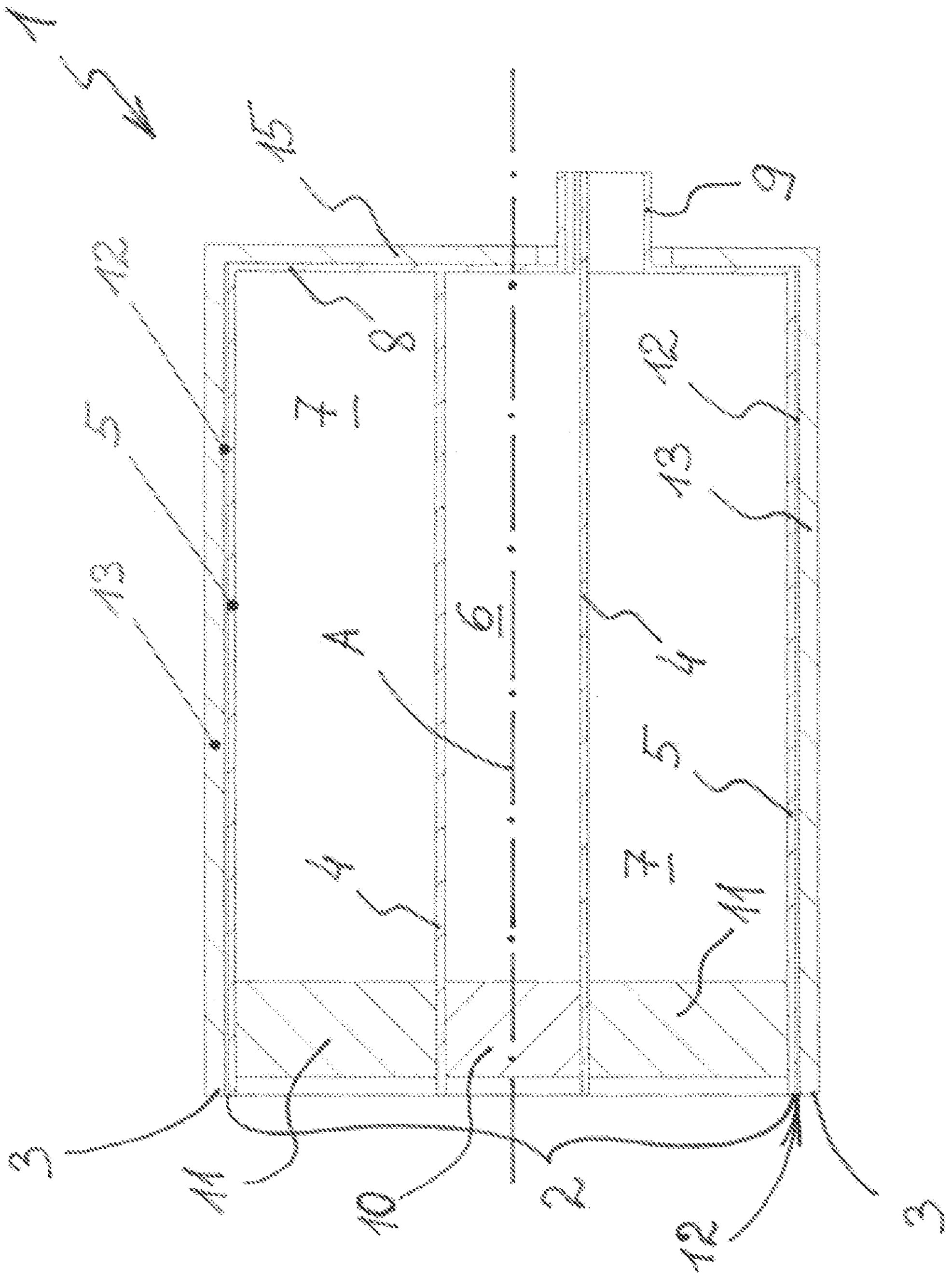
FIG. 1 shows a longitudinal section of a system according to a first embodiment of the invention.

According to an aspect of the invention, a system for storing and dispensing a flowable multi-component composition (hereinafter referred to as the composition) is provided. Said system comprises a coaxial cartridge for storing the multi-component composition, and a support structure into which the cartridge can be inserted for pressing the composition out of said cartridge. The multi-component composition comprises at least a first component and a second component, which are stored separately from one another in the cartridge and are only intended to be mixed with one another when they are dispensed from the cartridge. This can in particular be a sealing or fastening composition such as mortar, adhesive and the like.

The cartridge comprises a hollow-cylindrical cartridge inner wall, and a cartridge outer wall which is arranged coaxially (i.e., having the same cylinder axis) around said inner wall and is also cylindrical at least on the inside. The cartridge thus has an inner chamber, which is delimited radially by the cartridge inner wall, for receiving the first component of the multi-component composition, and an outer chamber, which is arranged radially between the cartridge inner wall and the cartridge outer wall, for receiving the second component of the multi-component composition. Even if the following explanation of the invention and the embodiments usually only mention these two chambers for two components, further (partial) chambers for other components of the multi-component composition can always be provided inside the cartridge, which components are dispensed from the cartridge in the same pressing-out process and mixed with the first and second components.

On one of its two (in the axial direction) opposite end faces, the cartridge has a cartridge front wall which firmly closes the inner chamber and the outer chamber in the axial direction, and has a dispensing opening for the first component in the region of the inner chamber and a dispensing opening for the second component in the region of the outer chamber.

In particular, the cartridge further comprises an inner piston which closes the inner chamber at the rear (i.e., toward the other end face of the cartridge) and can be moved axially in said inner chamber, and an outer piston which likewise closes the outer chamber at the rear and can be moved axially in said outer chamber. The inner piston is designed to press the first component out of the inner chamber and the outer piston is designed to press the second component out of the outer chamber by means of simultaneous axial movement of the two pistons toward the cartridge front wall (this is referred to herein as the pressing-out process).

For this pressing-out process, the system comprises a support structure which is designed to receive and hold the cartridge when the composition is pressed out of said cartridge and for this purpose has a side wall which is shaped at least partly like a tube portion and is at least partly closed on its first end face by a support structure front wall designed to support the cartridge front wall. The inner diameter of this side wall is designed to vary or be adjustable in the axial and/or radial direction of the support structure (i.e., can be varied by applying a suitable force in the system or from the outside) in such a way that an annular gap (i.e., play) between the cartridge outer wall and the side wall is created or can be adjusted when the cartridge is inserted into and removed from the support structure, and a tight fit of the side wall against the cartridge outer wall (i.e., without the annular gap mentioned in between) is created or can be adjusted over the duration of a pressing-out process. This support structure can thus allow both easy insertion/removal of the cartridge and also a tight fit against said cartridge in the case of pressing-out in order to avoid the disruptive pumping behavior (i.e., elastic restoring behavior) of the cartridge described at the outset.

In the following, a number of different design options will be shown to make the annular gap between the cartridge and the support structure variable in this way:

According to a first embodiment, the cartridge outer wall is also designed to be cylindrical on the outside (cf. FIG. 1). The side wall of the support structure is designed as a cylindrical tube which is slit in the axial direction and is in particular made of elastically deformable material (e.g., steel). The support structure also has an externally operable closing and opening mechanism for this slit such that when the slit is open, the tube has an inner diameter that is larger than an outer diameter of the cartridge outer wall by a predetermined annular gap which is twice the width, while when the slit is closed, the tube tightly fits against the cartridge outer wall. Thus, by closing its closing and opening mechanism, the support structure lies completely against the cartridge, pumping of the cartridge when pressure is applied is prevented and the composition can be pressed out. Said predetermined annular gap width can, for example, be just large enough to enable the cartridge to be inserted into and removed from the support structure without any friction.

Figure 2:
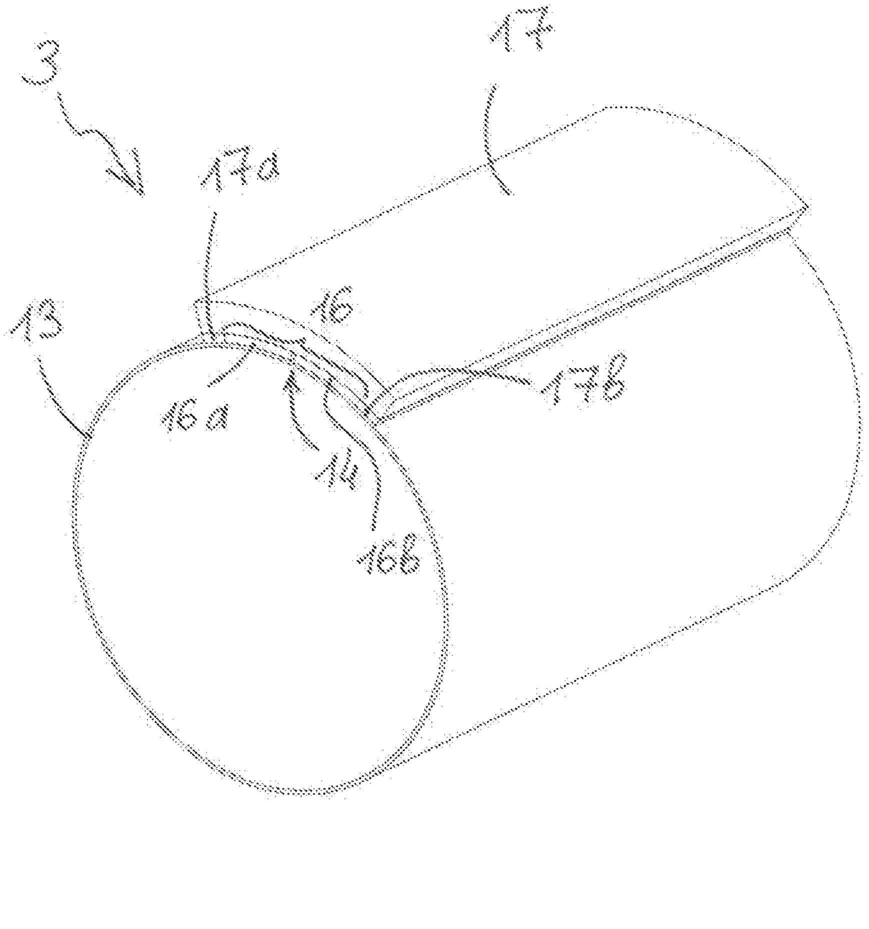
FIG. 2 shows a perspective view of a slit support structure of the system from FIG. 1 having a wedge closure with the slit open.
Figure 3:
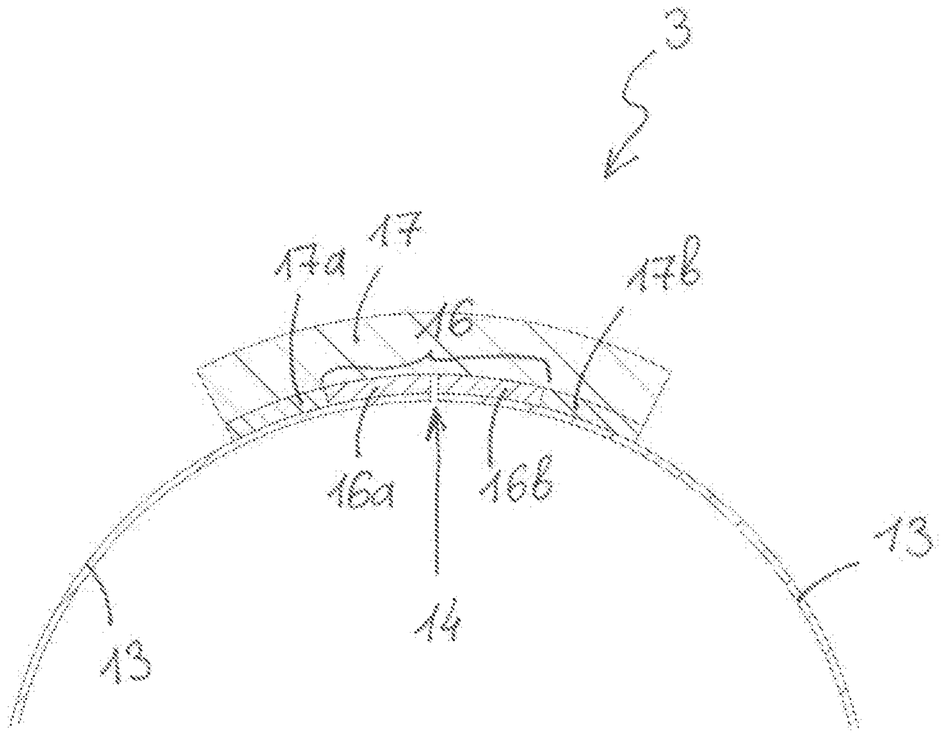
FIG. 3 shows a half radial cross section of the support structure from FIG. 2 having the wedge closure with the slit open.
Figure 4:
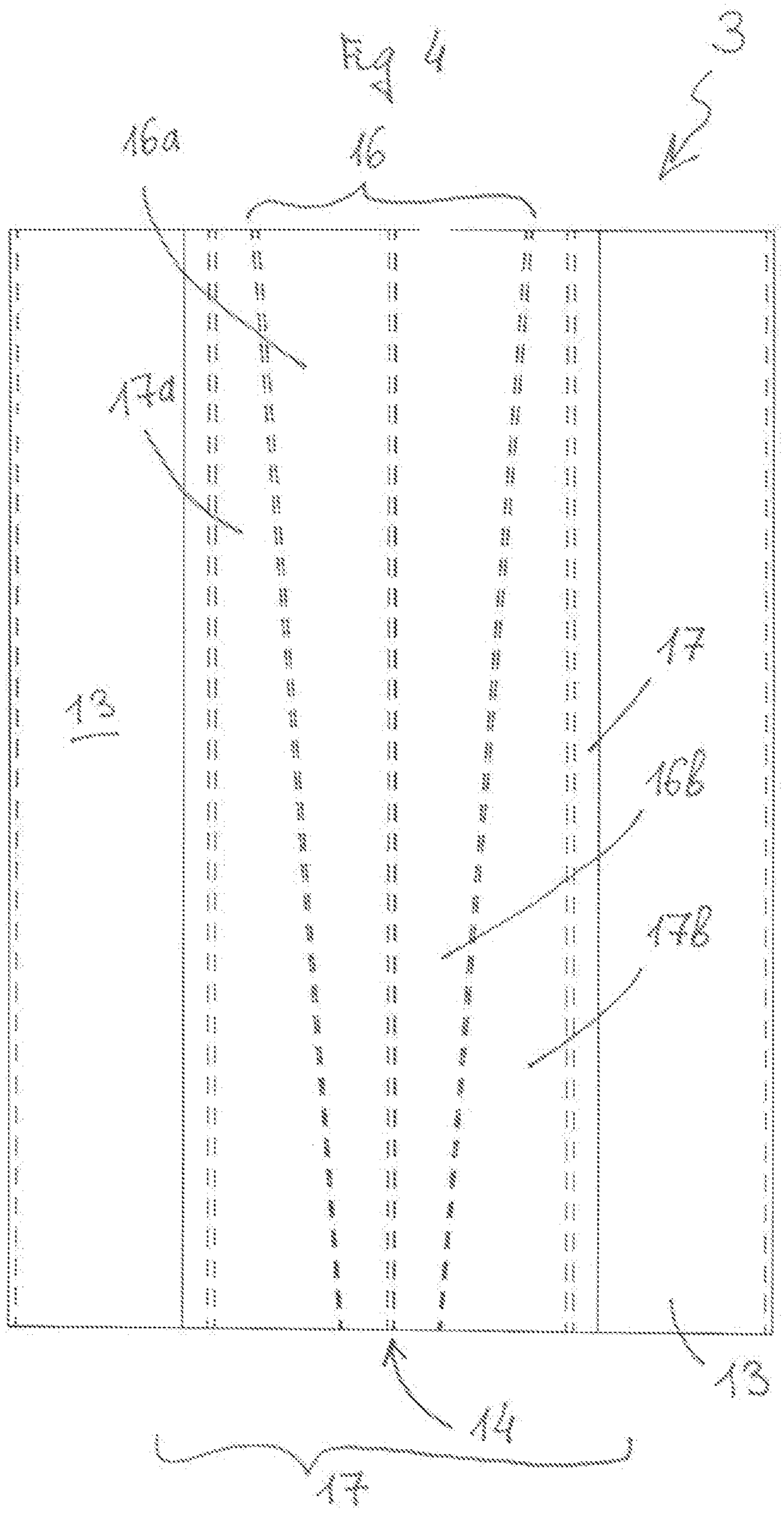
FIG. 4 shows an axial side view of the support structure from FIG. 2 looking at its wedge closure with the slit open and closed.

In particular, the closing and opening mechanism for the slit can be designed as a wedge system (cf. FIG. 2-4). Said system comprises an axially slit inner wedge consisting of two wedge halves which are attached on the outside to the tube on both sides of its slit and taper in the axial direction of the tube in the shape of a wedge. Furthermore, the wedge system comprises an outer wedge which encloses the inner wedge on the outside, can be shifted axially on said inner wedge and has two opposite wedge-shaped inner flanks which face the inner wedge. The wedge-shaped inner flanks of the outer wedge are designed in such a way that when the outer wedge is axially shifted in one direction, said inner flanks push the two wedge halves of the inner wedge toward one another in the circumferential direction until the slit in the tube closes as a result. Axially shifting the outer wedge in the other direction allows the inner wedge, and with it the slit in the tube, to open again.

In particular, the support structure in this embodiment can have an integrated cover which can be adjusted between an open state for inserting and removing the cartridge and a closed state for holding the cartridge in the support structure and for carrying out a pressing-out process. The closing and opening mechanism for the slit can be mechanically coupled to the cover in that when the cover is open, the slit is also open and when the cover is closed, the slit is also closed.

Figure 5B:
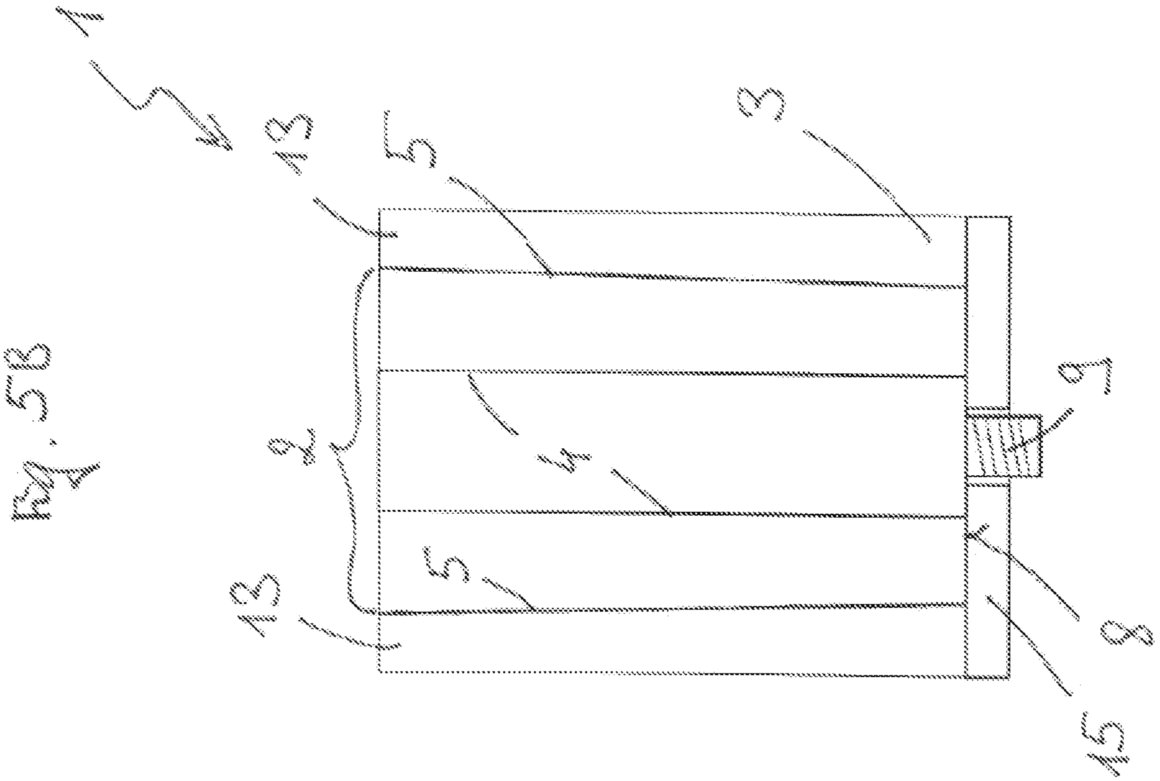
FIG. 5B shows a longitudinal section of a system according to a second embodiment of the invention without an annular gap when the cartridge is fully inserted.
Figure 5A:
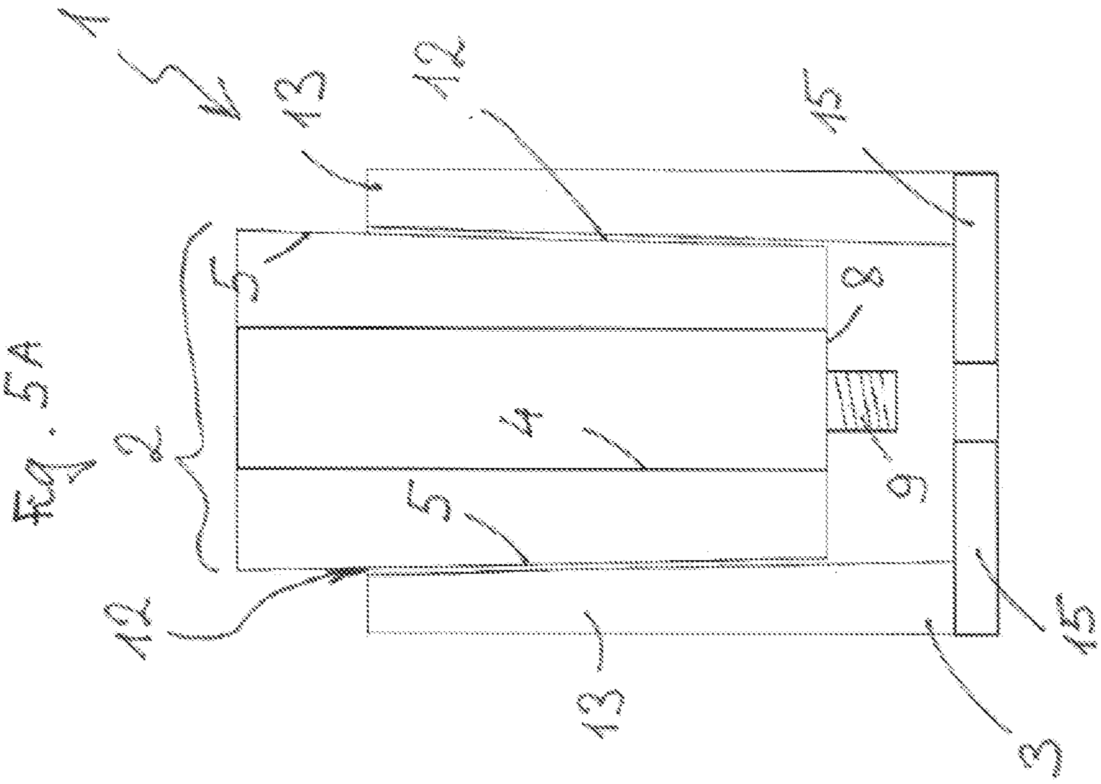
FIG. 5A shows a longitudinal section of a system according to a second embodiment of the invention having an annular gap between the cartridge and the support structure when inserting the cartridge.

According to a second embodiment, the cartridge outer wall is conical on the outside and tapers toward the cartridge front wall at a predetermined cone gradient (cf. FIG. 5A-5B). The side wall of the support structure also tapers conically on the inside toward the support structure front wall at the same cone gradient as the cartridge outer wall and has the same inner diameter on the support structure front wall as an outer diameter of the cartridge outer wall on the cartridge front wall. Due to this geometry, while the cartridge is inserted into the support structure and the cartridge is removed therefrom, there is an annular gap between the cartridge outer wall and the side wall that only closes completely when the cartridge front wall hits the support structure front wall. Here too, the support structure for the pressing-out process lies completely against the cartridge so that the composition can be pressed out without any disruptive restoring behavior from the cartridge outer wall.

Figure 6:
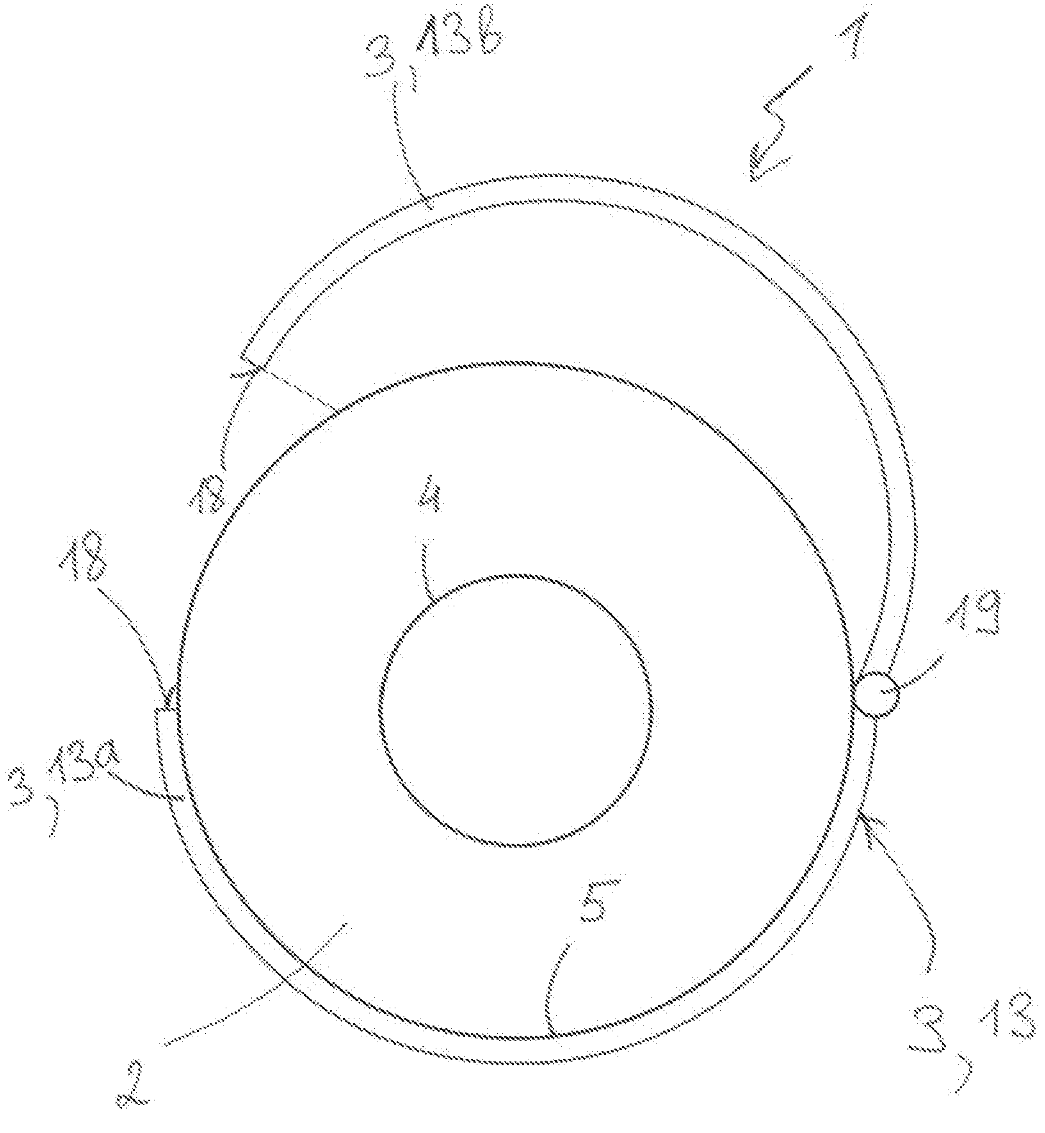
FIG. 6 shows a cross section of the system from FIGS. 5A-5B with a side wall of the support structure open along an axial dividing line.

In particular, the support structure in this embodiment can be opened and closed again along an axial dividing line in its side wall to remove the cartridge inserted therein (cf. FIG. 6). For this purpose, said support structure can have two side wall segments which can be reversibly separated from one another along this axial dividing line, each extend only over a partial angle segment in the circumferential direction and are rotatably connected to one another, for example by means of an axial hinge or another rotary joint, along an axial connecting line that is circumferentially apart from the dividing line. This can also be used to insert the cartridge into the support structure to make it even easier.

Figure 7:
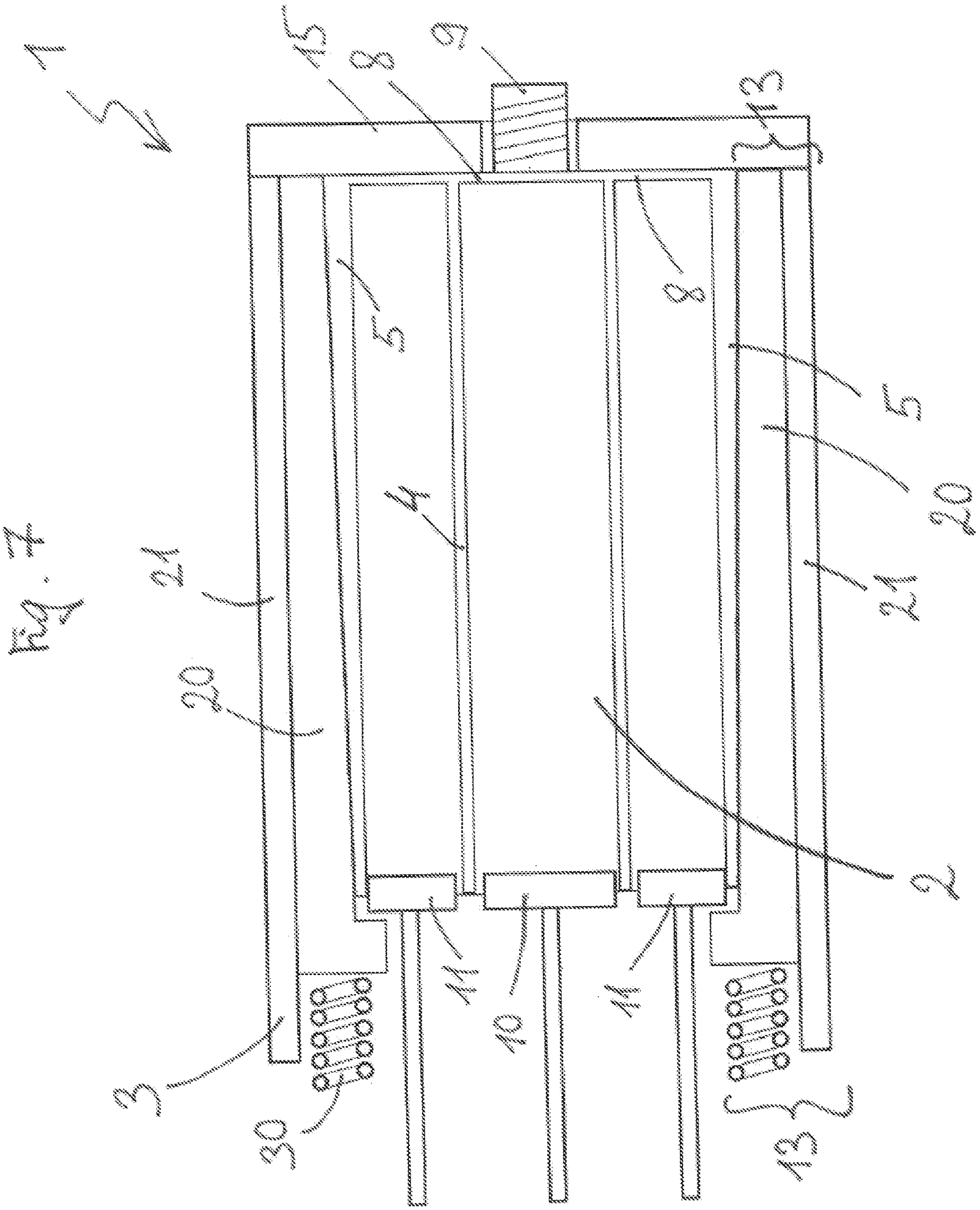
FIG. 7 shows a longitudinal section of a system according to a third embodiment of the invention.

According to a third embodiment, the cartridge outer wall is designed to be conical on the outside and widens toward the cartridge front wall at a predetermined cone gradient (cf. FIG. 7). The support structure front wall is designed as a reversibly closable cover for opening the support structure to insert the cartridge via the first end face of the support structure and for closing the support structure for the duration of a pressing-out process. The side wall of the support structure is composed of a cylindrical outer tube and an inner tube which is inserted into said outer tube and mounted in an axially shiftable manner therein. The inner tube widens conically on the inside toward the support structure front wall at the same cone gradient as the cartridge outer wall and has the same inner diameter on the support structure front wall as an outer diameter of the cartridge outer wall on the cartridge front wall. The support structure has an axial pressure device (for example in the form of a spring which loads the inner tube with spring force in the axial direction) on its second end face that is designed to press the inner tube against the closed cover. Here too, the support structure for the pressing-out process lies completely against the cartridge so that the composition can be pressed out without any disruptive restoring behavior from the cartridge outer wall.

According to a fourth embodiment, the cartridge outer wall is also designed to be cylindrical on the outside. The side wall of the support structure is composed of an outer tube which tapers conically on the inside toward the support structure front wall at a predetermined cone gradient, and an inner tube which is mounted in an axially shiftable (and in particular completely removable) manner in said outer tube, is designed to be cylindrical on the inside and is axially slit multiple times to vary its diameter. (The outer tube geometry mentioned can be achieved, for example for manufacturing or stability reasons, by a suitable conical tubular inner layer which is permanently fixed in a stable cylindrical outer tube, e.g., as in FIG. 8.)

The inner tube tapers conically on the outside toward the support structure front wall at the same cone gradient as the outer tube and, when said inner tube rests against the support structure front wall, said inner tube has completely closed slits and the same inner diameter as an outer diameter of the cartridge outer wall. The support structure has an axial pressure device (for example in the form of a spring which loads the inner tube with spring force in the axial direction) on its second end face that is designed to press the inner tube against the support structure front wall. Here too, the support structure for the pressing-out process lies completely against the cartridge so that the composition can be pressed out without any disruptive restoring behavior from the cartridge outer wall.

Figure 8:
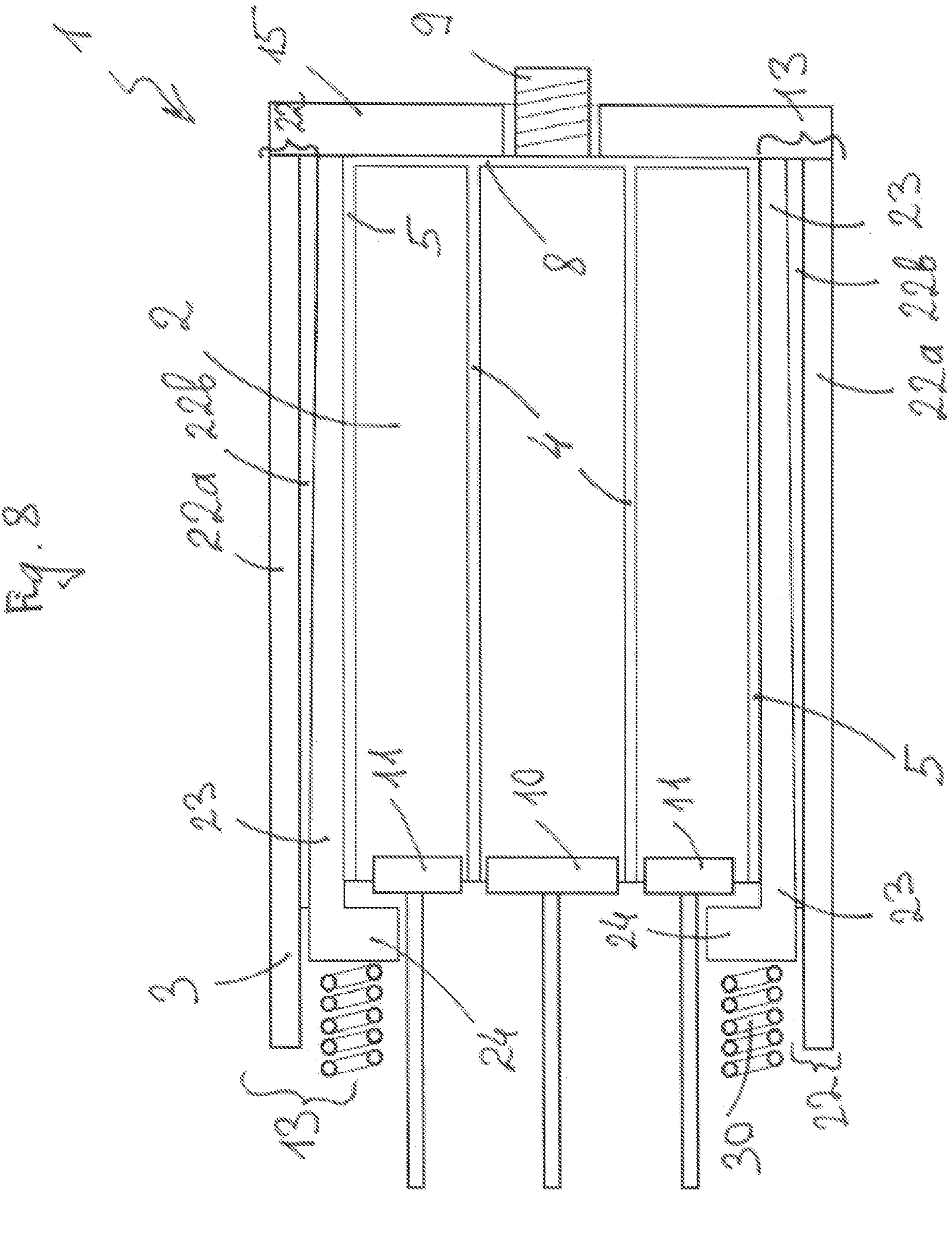
FIG. 8 shows a longitudinal section of a system according to a fourth embodiment of the invention.

In particular, the inner tube in this embodiment can have carrier hooks on the second end face of the support structure that project radially inward and are arranged axially behind the outer piston of the cartridge inserted in the support structure (cf. FIG. 8). The carrier hooks project radially behind the outer piston such that the outer piston, when it is pulled back after the pressing-out process to remove the cartridge, takes the inner tube of the support structure with it by means of the carrier hooks and pulls said inner tube out of the outer tube. As a result, the slits of the inner tube open at the same time and an annular gap is formed between the cartridge outer wall and the side wall of the support structure, which facilitates removal.

According to a fifth embodiment, the cartridge outer wall is also designed to be cylindrical on the outside. The side wall of the support structure is composed of a cylindrical outer tube, a plurality of outer rings which are each mounted in said outer tube in an axially shiftable manner, each taper in axial cross section in a trapezoidal or triangular shape inwardly (i.e., toward the cylinder axis) and each rest with their broad sides against an inside of the outer tube, as well as a plurality of inner rings which are each arranged alternately with the outer rings in the axial direction, partly project radially between the outer rings and each widen in axial cross section in a trapezoidal or triangular shape inwardly (cf. FIG. 9). Each inner ring has a plurality of radial incisions or indentations distributed over its circumference to change its diameter (cf. FIG. 10) such that said inner ring can be pressed radially inward by axially pushing together the adjacent outer rings and, as a result, the inner diameter of said inner ring can be reduced until it is equal to the outer diameter of the cartridge outer wall so that said inner ring is pressed against the outer wall of the cartridge inserted in the support structure. For this purpose, the support structure has an axial pressure device (for example in the form of a spring which loads the outer rings with spring force in the axial direction) on its second end face that is designed for axially pushing the outer rings together toward the support structure front wall.

In particular, the inner rings on their broad inner sides facing the cartridge can be geometrically complementary to the geometry of the cartridge outer wall and geometrically designed for said interaction with the outer rings in such a way that said inner rings, when they rest against the cartridge outer wall, completely cover said cartridge outer wall and, as a result, support it radially over the entire surface during the pressing-out process.

According to a sixth embodiment, the cartridge outer wall is also designed to be cylindrical on the outside. The side wall of the support structure is composed of a cylindrical outer tube and a hydraulic cushion which rests, on the inside, on the outer tube over its entire radial circumference and also at least partly on the support structure front wall and is filled with a flowable medium (cf. FIG. 11).

The hydraulic cushion is designed and dimensioned in such a way that, when the cartridge is inserted in the support structure, said hydraulic cushion encloses the entire outer wall of said cartridge and at least part of the cartridge front wall. Its inner diameter, in its unloaded state which prevails before and during the insertion of the cartridge into the support structure, is larger than an outer diameter of the cartridge outer wall by a predetermined annular gap which is twice the width. On the other hand, in its loaded state which occurs at the start of a pressing-out process and the associated pressing of the cartridge outer wall against the support structure front wall, the cushion comes to fit tightly against the entire cartridge outer wall due to the immediate escape/displacement of the flowable medium from front wall portions into side wall portions of the cushion. Here too, the support structure for the pressing-out process lies completely against the cartridge so that the composition can be pressed out without any disruptive restoring behavior from the cartridge outer wall. Said predetermined annular gap width can, for example, be large enough to allow the cartridge to be inserted into and removed from the support structure without any friction.

In particular, the flowable medium can be largely incompressible at least at pressures which can be reached during a pressing-out process in the system so that when the cartridge outer wall is pressed against the support structure front wall, said medium is displaced from the front wall portions into the side wall portions of the cushion right at the beginning of the pressing-out process, until the annular gap remaining between the cushion and the cartridge outer wall closes. A gel or a liquid, for example, can be suitable as a flowable medium for this purpose. In principle, however, certain gases, which are compressible but can quickly escape into the side wall portions under increasing pressure in the front wall portions of the cushion and, as a result, also cause them to swell radially, can also be suitable for the described functionality.

In the present case, the cartridge inner wall and the cartridge outer wall can each have a circular cross section. However, this is not absolutely necessary for the functional principle presented here, and therefore in principle other cross-sectional shapes, such as elliptical or rectangular, can also be produced.

At least the cartridge inner wall and/or the cartridge outer wall can be made of plastics material. In particular, the entire cartridge can be made of plastics material, and its individual constituents can be made of the same or different types of plastics material. In principle, however, other materials, such as metal, can also be used. The same can also apply accordingly to the support structure.

In a specific embodiment, the cartridge front wall has a connecting piece on its side facing away from the inner and outer chambers, into which connecting piece the dispensing openings of the inner and outer chambers each open and which is designed for connecting a mixer for mixing the various components of the multi-component composition during the pressing-out process.

Figure 9:
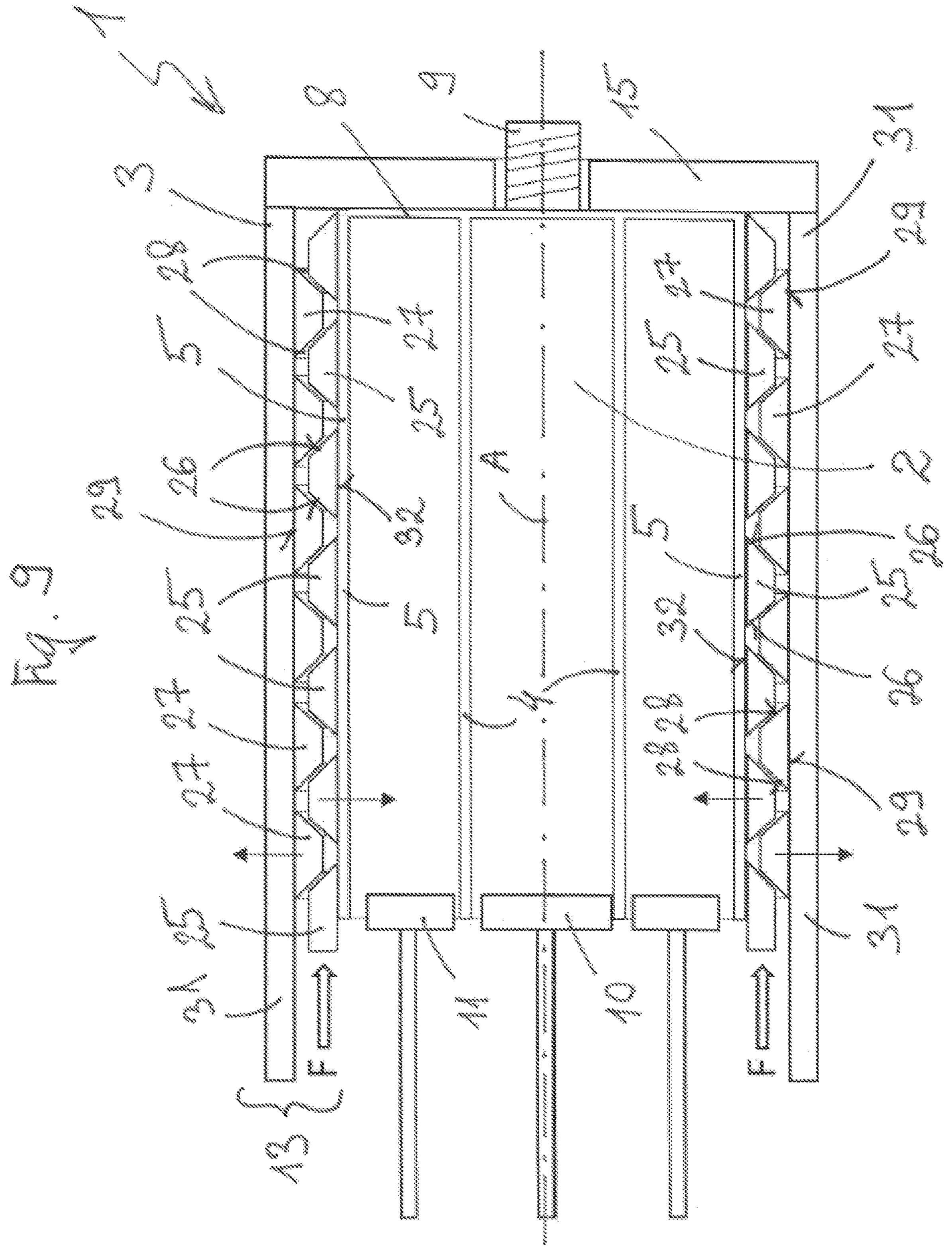
FIG. 9 shows a longitudinal section of a system according to a fifth embodiment of the invention.
Figure 10:
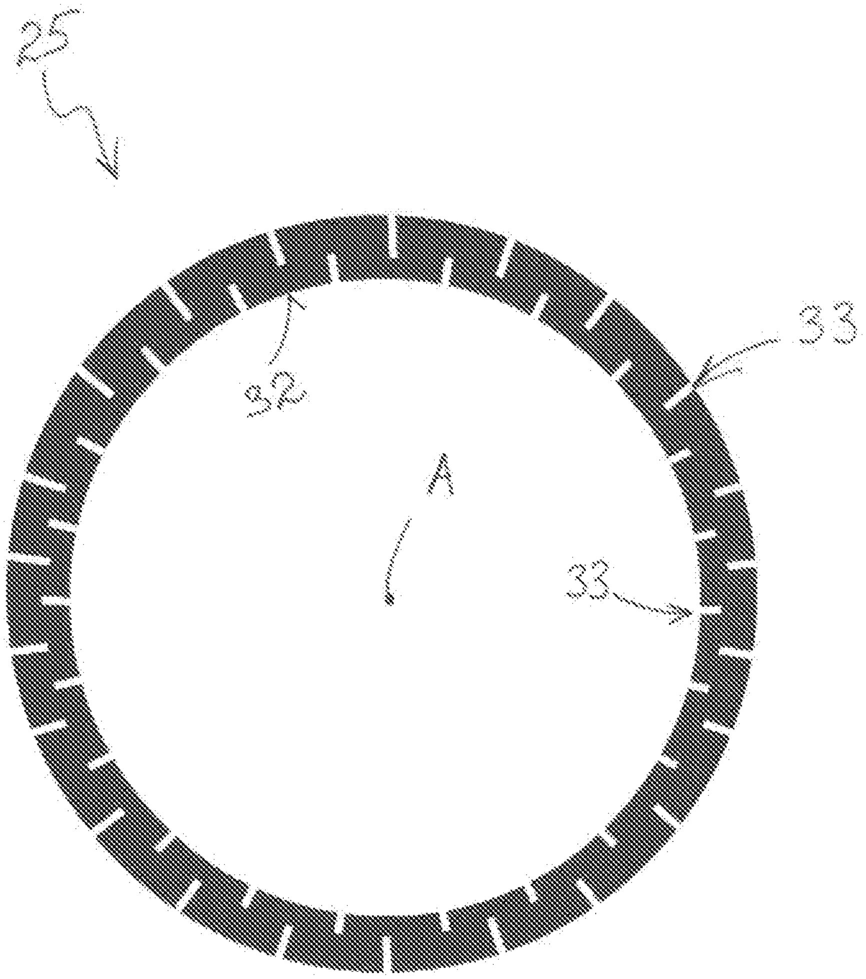
FIG. 10 shows a radial cross section of an inner ring of the support structure from FIG. 9.
Figure 11:
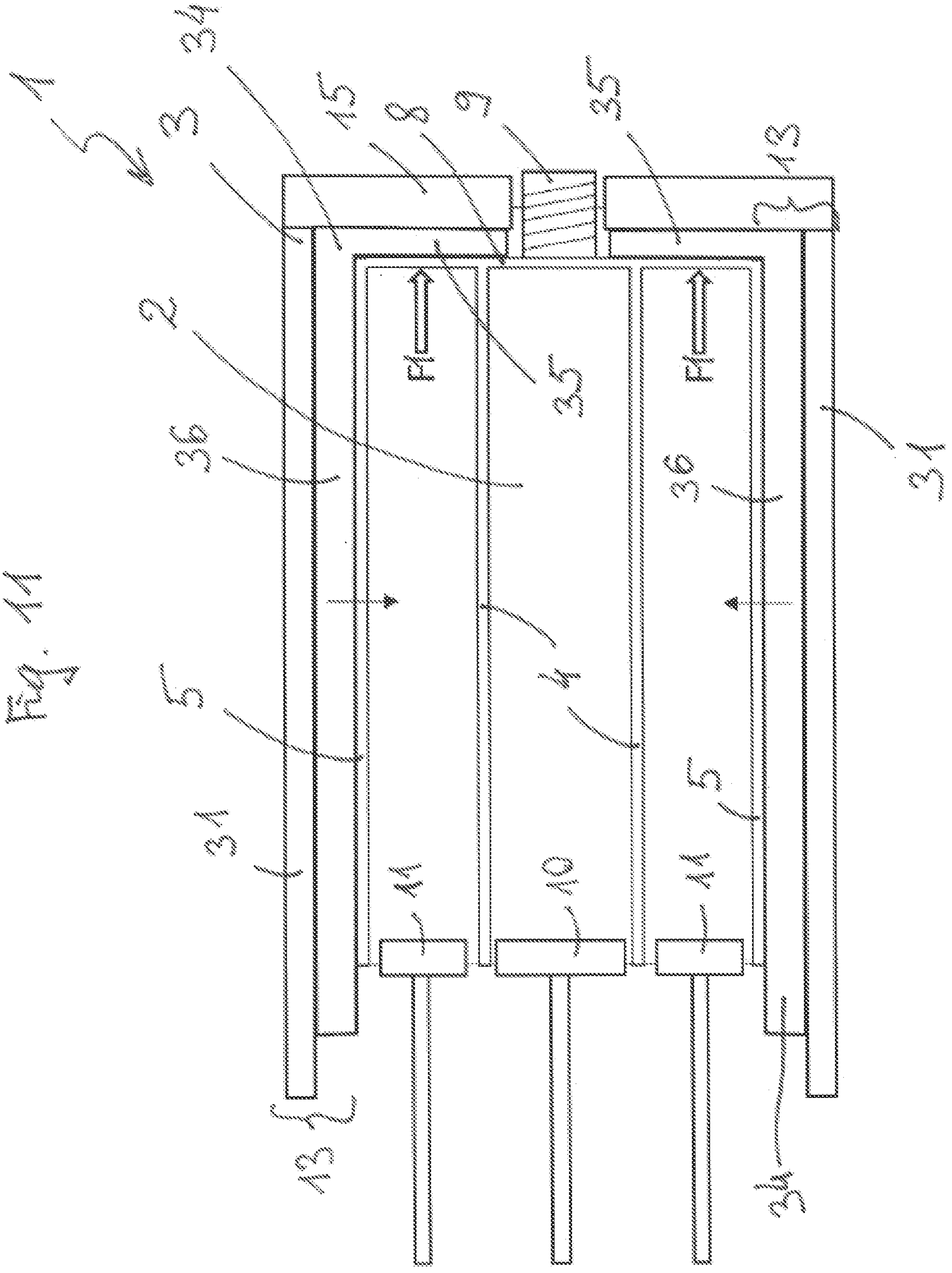
FIG. 11 shows a longitudinal section of a system according to a sixth embodiment of the invention.

The above aspects of the invention and the embodiments and specific designs thereof are explained in more detail below with reference to the examples shown in the drawings. The drawings are schematic. Said drawings may be, but do not have to be, understood as true to scale. In the drawings:

FIG. 1 shows a longitudinal section of a system according to a first embodiment of the invention;

FIG. 2 shows a perspective view of a slit support structure of the system from FIG. 1 having a wedge closure with the slit open;

FIG. 3 shows a half radial cross section of the support structure from FIG. 2 having the wedge closure with the slit open;

FIG. 4 shows an axial side view of the support structure from FIG. 2 looking at its wedge closure with the slit open and closed;

FIGS. 5A-5B show a longitudinal section of a system according to a second embodiment of the invention having an annular gap between the cartridge and the support structure when inserting the cartridge (5A) and without an annular gap when the cartridge is fully inserted (5B);

FIG. 6 shows a cross section of the system from FIGS. 5A-5B with a side wall of the support structure open along an axial dividing line;

FIG. 7 shows a longitudinal section of a system according to a third embodiment of the invention;

FIG. 8 shows a longitudinal section of a system according to a fourth embodiment of the invention:

FIG. 9 shows a longitudinal section of a system according to a fifth embodiment of the invention;

FIG. 10 shows a radial cross section of an inner ring of the support structure from FIG. 9; and FIG. 11 shows a longitudinal section of a system according to a sixth embodiment of the invention.

FIG. 1, in an axial longitudinal section, shows an example of a system 1 according to a first embodiment of the invention, in which a coaxial cartridge 2 for pressing out the multi-component composition contained therein is inserted into a support structure 3, of which the side wall 13 is designed as a one-piece slit tube having an axial slit 14 (which can only be seen in the views from FIG. 2 to 4) and a wedge closure (wedge system) as a closing and opening mechanism (cf. FIG. 2-4) for the slit 14.

The cartridge 2 comprises a hollow-cylindrical cartridge inner wall 4 and a hollow-cylindrical cartridge outer wall 5, which is arranged around said cartridge, having a common cylinder axis A, as a result of which an inner chamber 6, which is delimited radially by the cartridge inner wall 4, and an outer chamber 7, which is arranged radially between the cartridge inner wall 4 and the cartridge outer wall 5, are formed. A first component of the multi-component composition to be dispensed is received in the inner chamber 6, while a second component of the multi-component composition is received in the outer chamber 7 (not shown).

On the first end face of the cartridge 2, which is on the right in FIG. 1, the cartridge front wall 8 closes the inner chamber 6 and the outer chamber 7, with a dispensing opening being formed in each chamber in the cartridge front wall 8. The two dispensing openings open into a connecting piece 9 which is formed in the cartridge front wall 8 on the side facing away from the inner and outer chambers 6, 7 and is designed for connecting (e.g., by putting on or screwing on) a mixer (not shown) for mixing the first and the second component of the multi-component composition during the pressing-out process.

Furthermore, the cartridge 2 comprises an inner piston 10 which closes the inner chamber 6 at the rear and can be moved axially in said inner chamber, and an outer piston 11 which closes the outer chamber 7 at the rear and can be moved axially in said outer chamber; by means of the simultaneous axial movement of said pistons (in FIG. 1 to the right), the multi-component composition can be pressed out of the cartridge 2 through the dispensing openings of the cartridge front wall 8 (pressing-out process). The support structure 3 is closed (with the exception of an opening through which the connecting piece 9 of the cartridge 2 projects outward) on its first end face (on the right in FIG. 1) by a support structure front wall 15 which is formed in one piece with the side wall 13 in this example. The support structure front wall 15 is used to support the cartridge front wall 8 during the pressing-out process.

As shown in FIG. 1, when the slit 14 is open (shown in FIG. 2-4), an inner diameter of the support structure 3 is larger than an outer diameter of the cartridge 2 by a predetermined annular gap which is twice the width, so that a cylindrical annular gap 12 remains between the cartridge outer wall 5 and the side wall 13 of the support structure 3, which facilitates the insertion of the cartridge 5 into the support structure 3.

In order to make the annular gap 12 variable, the side wall 13 of the support structure 3 in FIG. 1 is designed as a slit cylindrical tube, preferably made of an elastically deformable material (e.g., steel). The axial slit 14, which is open in the spring-open state according to FIG. 1, cannot be seen in the longitudinal section of FIG. 1 and is explained below with reference to FIG. 2-4.

FIG. 2 to 4 show the slit 14 and its closing and opening mechanism, which is designed as a wedge system purely by way of example, in three different views. FIG. 2 shows the support structure 3 from FIG. 1 in a perspective view, FIG. 3 shows the support structure in a half radial cross section, and FIG. 4 shows the support structure in a side view looking at the slit 14 and the wedge system.

The slit 14 extends in the longitudinal direction of the tube. The width of the slit 14 is, for example, approximately 5 mm, sufficient for a tube diameter of approximately 113 mm. The slit width should be selected according to the tube diameter in order to ensure a sufficient annular gap 12 for inserting/removing the cartridge 2 as well as a sufficient path for clamping the support structure 3 and to allow the support structure 3 to fit tightly against the cartridge 2 for the pressing-out process.

The closing and opening of the slit 14 can be made possible by clamping the one-piece, slit tube by means of a wedge system composed of a likewise slit inner wedge 16 which is fastened to the tube and consists of two wedge halves 16*a* and 16*b* extending axially on both sides of the slit 14, and of an outer wedge 17 which can be shifted axially on the inner wedge 16, encloses the two wedge halves 16*a* and 16*b* and has wedge-shaped inner flanks 17*a* and 17*b*.

If the outer wedge 17 is pushed back in the axial direction, the slit tube opens due to the spring action of its material. The annular gap 12 (FIG. 1) is thus guaranteed. If the enclosing outer wedge 17 is pushed onto the two underlying wedge halves 16*a* and 16*b* of the inner wedge 16, the gap 14 in the side wall 13 closes and the annular gap 12 in FIG. 1 is eliminated. It is therefore possible for the support structure 3 to firmly enclose the cartridge 2. The open and closed positions described for all the elements involved are indicated in FIG. 4 by dashed lines.

According to a particularly favorable specific embodiment of the system 1, the movement of the enclosing outer wedge 17 is coupled with the closing of a cover (not shown separately) on the pressing-out device (i.e., support structure 3), which cover is provided for reversibly opening the support structure for inserting and removing the cartridge 2. If this cover is open, an annular gap 12 has formed between the cartridge 2 and the support structure 3 and the cartridge 2 can be pushed in. If the cover is closed, the enclosing outer wedge 17 is pulled over the support structure 3, and the annular gap 12 closes as a result. The support structure 3 thus lies completely against the cartridge 2, pumping of the cartridge 2 when pressure is applied is prevented and the composition can be pressed out.

Only the differences with respect to the first embodiment described in FIG. 1-4 will be discussed in the following description of further examples of the system 1 of the type presented here with reference to FIG. 5A-11. Otherwise, the same can apply to the cartridge 2 and to the support structure 3 as described above with reference to FIG. 1.

FIG. 5A-5B each show a longitudinal section of a system 1 according to a second embodiment of the invention having an annular gap 12 between the cartridge 2 and the support structure 3 when inserting or removing the cartridge 2 (FIG. 5A) and without an annular gap 12 when the cartridge 2 is fully inserted (FIG. 5B). Easy-to-handle insertion and removal of the cartridge 2 with simultaneous elimination of the annular gap 12 when the cartridge 2 is inserted can be achieved here by a conical design of the cartridge 2 on the outside and a conical design of the support structure 3 on the inside having an exact as possible cone gradient.

The cartridge 2 tapers toward the front (i.e., toward the cartridge front wall 8) due to a conical outer wall. The support structure 3 also has the same geometric configuration, which likewise tapers toward the front (i.e., toward the support structure front wall 15). The angles of the cartridge outer wall 5 and the side wall 13 of the support structure 3 are identical. The cartridge inner wall 4 can remain cylindrical and does not require a conical design. However, in this case, it is not possible to fill the pressing-out device (support structure 3) from the front. Instead, the cartridge 2 can be inserted axially from behind or from the side into a two-part support structure 3 outlined in FIG. 6. Dividing the conical side wall 13 in two offers the advantage that the cartridge 2 can be removed again more easily after it has been pressurized (i.e., after the pressing-out process).

FIG. 6 shows a cross section of the system 1 from FIG. 5A-5B having a side wall 13 of the support structure 3 that is open along an axial dividing line 18. For this purpose, the side wall 13 has two side wall segments 13*a* and 13*b* which can be reversibly separated from one another along the axial dividing line 18 and are rotatably connected to one another along an axial connecting line 19 (for example in the form of a hinge) which is circumferentially apart from the dividing line 18.

FIG. 7 shows a longitudinal section of a system 1 according to a third embodiment of the invention. In order to ensure that the cartridge 2 is inserted from the front, the cartridge 2 tapers backward here and not forward, in contrast to FIG. 5A-5B. For this purpose, the side wall 13 of the support structure 3 has a movable conical element in the form of a conical inner tube 20 which is inserted into a cylindrical outer tube 21. The inner tube 20 is loaded by means of an axial pressure device 30 in the form of springs arranged on the second end face of the support structure 3 and is mounted in the outer tube 21 in an axially shiftable manner.

If contact occurs between the cartridge 2 and the conical inner tube 20, the entire formation is pushed further into the enclosing support structure 3 until the cartridge front wall 8 is flush with the side wall 13 of the support structure 3 and the support structure front wall 15 can be closed in the form of a cover. Using this embodiment, the influence of any diameter tolerances in the cartridge 2 or the support structure 3 can be reduced or eliminated. The removal of the empty cartridge 2 can be supported by the pistons 10/11 of the cartridge 2 or the pressing-out device by said pistons or pressing-out device pushing the empty cartridge 2 forward out of the enclosing cone of the inner tube 20 when the support structure front wall 15 (cover) is open.

FIG. 8 shows a longitudinal section of a system 1 according to a fourth embodiment of the invention. In order to be able to do without a conical design of the cartridge 2, two conical elements are provided in the side wall 13 of the support structure 3 here: a conical outer tube 22 and a conical inner tube 23. The conical outer tube 22 is composed in this example of a cylindrical outer tube 22*a* and a tubular inner layer 22*b* which is rigidly connected to said outer tube, tapers conically to the front and is not able to move axially or radially with respect to the cylindrical outer tube 22*a*.

The movable conical inner tube 23, which encloses the cartridge 2, has multiple axial slits (not shown) in order to allow its diameter to change so that it fits tightly against the cartridge 2 for the pressing-out process. Said inner tube is also mounted in an axially movable manner on the inside of the conical outer tube 22 and is spring-loaded with an axial pressure device 30 (similar to that in FIG. 7) in order to support the entire surface of the cartridge 2 when it is inserted. In order to be able to insert and remove the cartridge 2, the pistons 10/11 of the cartridge 2 or the pressing-out device can pull back the conical inner tube 23 using its carrier hooks 24 which grip radially and axially behind the piston 11 when the pistons 10/11 travel back and thus form an annular gap 12 similar to FIG. 1.

When the pistons 10/11 travel forward, they release the axial movement of the conical inner tube 23 again and the springs of the axial pressure device 30 press the inner tube 23 into the cone of the outer tube 22. The diameter of the inner tube 23 which has multiple slits becomes narrower, as a result of which said diameter rests against the cartridge 2 and the annular gap 12 is eliminated, as shown in FIG. 8.

FIG. 9 shows a longitudinal section of a system 1 according to a fifth embodiment of the invention. It shows another possibility of a conical design of the side wall 13 of the support structure 3 in a cylindrical cartridge 2 by applying many conical inner rings 25 which can be changed in diameter by suitable cutting in the radial direction (for example by radial incisions 33 as in FIG. 10). An axial force F, which can be applied, for example, by springs of an axial pressure device 30, as in FIG. 7 or 8, presses the conical inner rings 25 with their surfaces 26, which are conical on both sides in the axial direction, against adjacent outer rings 27, which likewise have surfaces 28 which are conical on both sides in the axial direction and rest with their broad sides 29 against a cylindrical outer tube 31 of the support structure 3 on which they are mounted in an axially shiftable manner.

The axial force F pushes the outer rings 27 together axially, as a result of which each of the inner rings 25, which are between said outer rings, are pushed inward (as illustrated by the radial arrows) due to the interaction of the conical surfaces 26 and 28. At the same time, this requires a reversible diameter reduction of the inner rings 25 by the elastic closing of their radial incisions 33 (FIG. 10). As a result, the inner rings 25 rest against the cartridge 2 with their broad inner sides 32 and eliminate the annular gap 12 (FIG. 1). When the axial force F is removed, the diameter of the inner rings 25 increases due to the spring action of the radial incisions 33 of the inner rings, and an annular gap 12 is created again between the support structure 3 and the cartridge outer wall 5 (cf. FIG. 1). Thus, easy-to-handle insertion or removal of the cartridge 2 is possible.

FIG. 10 shows a radial cross section of an inner ring 25 of the support structure 3 from FIG. 9. It shows a uniform distribution of radial incisions 33 by way of example that allow an elastic change in diameter of the inner ring 25. For this purpose, in this example, many radial incisions 33 are provided alternately on the outside and on the inside in the inner ring 25, which incisions only cut the inner ring 25 up to approximately half of its radial thickness or only slightly more.

FIG. 11 shows a longitudinal section of a system 1 according to a sixth embodiment of the invention, which illustrates a further design of a support structure 3 having a variable inner diameter for a cartridge outer wall 5 of cylindrical design. Here the inner diameter of the side wall 13 of the support structure varies by means of hydraulic action. For this purpose, the side wall 13 comprises a cylindrical outer tube 31, inside which a hydraulic cushion 34 is inserted that encloses the cartridge 2 both in circumference and on the front pressing surface (i.e., on the cartridge front wall 8). If pressure is applied from behind to the pistons 10/11 in the cartridge 2, the cartridge 2 presses on the end-face-side front wall portion 35 of the hydraulic cushion with a pressing force F1 equal to the pressing-out force provided by the pressing-out device. The flowable medium in the cushion 34 is displaced into the rear side portion section 36 of the cushion 34, i.e., the side wall portion comprising the cartridge outer wall 5, as a result of which its thickness increases radially inward and the inner diameter becomes correspondingly smaller so that the cushion 34 comes to rest against the cartridge 2 over its entire circumference and exerts a radial pressure indicated by arrows on said cartridge. Thus, the annular gap 12 that prevails in the unloaded state of the system 1 (cf. FIG. 1) closes so that expansion of the cartridge 2 when pressure is applied is prevented.

The invention claimed is:

1. A system for storing and dispensing a flowable multi-component composition, comprising:

a coaxial cartridge having a hollow-cylindrical cartridge inner wall, a cartridge outer wall which is arranged coaxially around said cartridge inner wall and is cylindrical at least on an inside, an inner chamber for a first component of the multi-component composition that is delimited radially by the cartridge inner wall, and an outer chamber for a second component of the multi-component composition that lies radially between the cartridge inner wall and the cartridge outer wall; and a cartridge front wall which firmly closes the inner chamber and the outer chamber on an end face of the coaxial cartridge and has a dispensing opening in each of the inner chamber and the outer chamber; and a support structure which is designed to receive and hold the coaxial cartridge when the multi-component composition is pressed out of said coaxial cartridge, and for this purpose has a side wall which is shaped at least partly like a tube portion and is at least partly closed on a first end face by a support structure front wall designed to support the cartridge front wall;

wherein an inner diameter of the side wall is varied or can be adjusted in an axial and/or radial direction of the support structure in such a way that an annular gap between the cartridge outer wall and the side wall is created, or can be adjusted when the coaxial cartridge is inserted into and removed from the support structure, and a tight fit of the side wall against the cartridge outer wall is created or can be adjusted over the duration of a pressing-out process;

wherein the cartridge outer wall is cylindrical on an outside;

wherein the side wall of the support structure is designed as a cylindrical tube which has a slit in the axial direction; and wherein the support structure has an externally operable closing and opening mechanism for the slit such that, when the slit is open, the tube is larger than an outer diameter of the cartridge outer wall by a predetermined annular gap which is twice the width, while, when the slit is closed, the tube fits tightly against the cartridge outer wall.

2. The system according to claim 1, wherein the coaxial cartridge has an inner piston which closes the inner chamber at the rear and can be moved axially in said inner chamber, and an outer piston which closes the outer chamber at the rear and can be moved axially in said outer chamber; and wherein the inner piston is designed to press the first component out of the inner chamber and the outer piston is designed to press the second component out of the outer chamber, by simultaneous axial movement of the inner piston and the outer piston toward the cartridge front wall in the support structure.

3. The system according to claim 2, wherein the cartridge outer wall is cylindrical on an outside;

wherein the side wall of the support structure comprises:

an outer tube which tapers conically on an inside toward the support structure front wall at a predetermined cone gradient, and an inner tube which is mounted in an axially shiftable manner in said outer tube, is cylindrical on an inside, and is axially slit multiple times to vary its diameter;

wherein the inner tube tapers conically on an outside toward the support structure front wall at the same cone gradient as the outer tube and, when said inner tube rests against the support structure front wall, said inner tube has completely closed slits and the same inner diameter as an outer diameter of the cartridge outer wall; and wherein the support structure has an axial pressure device on a second end face that is designed to press the inner tube against the support structure front wall.

4. The system according claim 3, wherein the inner tube has carrier hooks on the second end face of the support structure that project radially inward and are arranged axially behind the outer piston of the coaxial cartridge inserted in the support structure; such that the outer piston, when pulled back after the pressing-out process to remove the coaxial cartridge, takes the inner tube of the support structure by the carrier hooks and pulls said inner tube out of the outer tube, as a result of which the slits of the inner tube open at the same time and an annular gap forms between the cartridge outer wall and the side wall of the support structure.

5. The system according to claim 1, wherein the closing and opening mechanism for the slit is designed as a wedge system, comprising:

an axially slit inner wedge consisting of two wedge halves which are attached on an outside to the tube on both sides of the slit and taper in the axial direction of the tube; and an outer wedge which encloses the inner wedge on an outside, and can be shifted axially on said inner wedge and has two opposite wedge-shaped inner flanks which face the inner wedge and, when the outer wedge is axially shifted in one direction, pushes the two wedge halves of the inner wedge toward one another in a circumferential direction until the slit in the tube closes as a result, while axially shifting the outer wedge in the other direction allows the inner wedge and the slit in the tube to open again.

6. The system according to claim 1, wherein the support structure has an integrated cover which can be adjusted between an open state, which is designed for inserting the coaxial cartridge into the support structure and for removing the coaxial cartridge from the support structure, and a closed state, which is designed for holding the coaxial cartridge in the support structure and for carrying out the pressing-out process; and wherein the closing and opening mechanism for the slit is mechanically coupled to the cover such that when the cover is open, the slit is also open, and when the cover is closed, the slit is also closed.

7. The system according to claim 1, wherein the cartridge outer wall is conical on an outside and tapers toward the cartridge front wall at a predetermined cone gradient; and wherein the side wall of the support structure tapers conically on an inside toward the support structure front wall at the same cone gradient as the cartridge outer wall and has the same inner diameter on the support structure front wall as an outer diameter of the cartridge outer wall on the cartridge front wall; such that while the coaxial cartridge is inserted into the support structure, there is an annular gap between the cartridge outer wall and the side wall that only closes completely when the cartridge front wall hits the support structure front wall.

8. The system according to claim 7, wherein the support structure can be opened and dosed again along an axial dividing line in the side wall to remove the coaxial cartridge inserted therein, by said support structure having two side wall segments which can be reversibly separated from one another along the axial dividing line and are rotatably connected to one another along an axial connecting line that is circumferentially apart from the axial dividing line.

9. The system according to claim 1, wherein the cartridge outer wail is conical on an outside and widens toward the cartridge front wall at a predetermined cone gradient;

wherein the support structure front wall is designed as a reversibly closable cover for opening the support structure to insert the coaxial cartridge via the first end face of the support structure and for closing the support structure for the duration of the pressing-out process;

wherein the side wall of the support structure comprises a cylindrical outer tube and an inner tube which is inserted into said outer tube and mounted in an axially shiftable manner therein;

wherein the inner tube widens conically on an inside toward the support structure front wall at the same cone gradient as the cartridge outer wall and has the same inner diameter on the support structure front wall as an outer diameter of the cartridge outer wall on the cartridge front wall; and wherein the support structure has an axial pressure device on a second end face that is designed to press the inner tube against the closed cover.

10. The system according to claim 1, wherein the cartridge outer wall s cylindrical on an outside;

wherein the side wall of the support structure comprises: a cylindrical outer tube, a plurality of outer rings which are each mounted in said outer tube in an axially shiftable manner, each tapering in an axial cross section in a trapezoidal or triangular shape toward a cylinder axis and each resting with their broad sides against an inside of the outer tube, and a plurality of inner rings which are each arranged alternately with the outer rings in the axial direction, partly projecting radially between the outer rings and each widening in an axial cross section in a trapezoidal or triangular shape toward the cylinder axis;

wherein each inner ring has a plurality of radial incisions distributed over its circumference to change its diameter such that said inner ring can be pressed radially inward by axially pushing together adjacent outer rings and, as a result, the inner diameter of said inner ring can be reduced to be equal to the outer diameter of the cartridge outer wall so that said inner ring is pressed against the outer wall of the coaxial cartridge inserted in the support structure; and wherein the support structure has an axial pressure device on a second end face that is designed for axially pushing the outer rings together toward the support stricture front wall.

11. The system according to claim 10, wherein the inner rings on their broad inner sides facing the coaxial cartridge coincide geometrically with a geometry of the cartridge outer wall and are geometrically designed for interaction with the outer rings in such a way that said inner rings, when resting against the cartridge outer wall, completely cover said cartridge outer wall and, as a result, support the cartridge outer wall radially over the entire surface during the pressing-out process.

12. The system according to claim I. wherein the cartridge outer wall is cylindrical on an outside;

wherein the side wall of the support structure comprises a cylindrical outer tube and a hydraulic cushion which rests on an inside, on the outer tube over its entire radial circumference and also at least partly on the support structure front wall, and is filled with a flowable medium; and wherein the hydraulic cushion is designed and dimensioned in such a way that when the coaxial cartridge is inserted in the support structure, said hydraulic cushion encloses the entire outer wall of said coaxial cartridge and at least part of the cartridge front wall, wherein an inner diameter of the hydraulic cushion, in an unloaded state which prevails before and during insertion of the coaxial cartridge into the support structure, is larger than an outer diameter of the cartridge outer wall by a predetermined annular gap which is twice the width, whereas, in a loaded state which occurs at the start of the pressing-out process and pressing of the cartridge outer wall against the support structure front wall, the hydraulic cushion comes to fit tightly against the entire cartridge outer wall due to an immediate escape of the flowable medium from a front wall portion into a side wall portion.

13. The system according to claim 12, wherein the flowable medium is incompressible at least at pressures which can be reached during the pressing-out process in the system.

14. The system according to claim 1, wherein the cartridge outer wall is cylindrical on an outside:

wherein the side wall of the support structure comprises:

an outer tube which tapers conically on an inside toward the support structure front wall at a predetermined cone gradient, and an inner tube which is mounted in an axially shiftable manner in said outer tube, is cylindrical on an inside, and is axially slit multiple times to vary its diameter;

wherein the inner tube tapers conically on an outside toward the support structure front wall at the same cone gradient as the outer tube and, when said inner tube rests against the support structure front wall, said inner tube has completely closed slits and the same inner diameter as an outer diameter of the cartridge outer wall; and wherein the support structure has an axial pressure device on a second end face that is designed to press the inner tube against the support structure front wall.

15. A system for storing and dispensing a flowable multi-component composition, comprising:

a coaxial cartridge having a hollow-cylindrical cartridge inner wall, a cartridge outer wall which is arranged coaxially around said cartridge inner wall and is cylindrical at least on an inside, an inner chamber for a first component of the multi-component composition that is delimited radially by the cartridge inner wall, and an outer chamber for a second component of the multi-component composition that lies radially between the cartridge inner wall and the cartridge outer wall, and a cartridge front wall which firmly closes the inner chamber and the outer chamber on an end face of the coaxial cartridge and has a dispensing opening in each of the inner chamber and the outer chamber; and a support structure which is designed to receive and hold the coaxial cartridge when the multi-component composition is pressed out of said coaxial cartridge, and for this purpose has a side wall which is shaped at least partly like a tube portion and is at least partly closed on a first end face by a support structure front wall designed to support the cartridge front wall;

wherein an inner diameter of the side wall is varied or can be adjusted in an axial and/or radial direction of the support structure in such a way that an annular gap between the cartridge outer wall and the side wall is created, or can be adjusted when the coaxial cartridge is inserted into and removed from the support structure, and a tight fit of the side wall against the cartridge outer wall is created or can be adjusted over the duration of a pressing-out process;

wherein the cartridge outer wail is conical on an outside and widens toward the cartridge front wall at a predetermined cone gradient;

wherein the support structure front wall is designed as a reversibly closable cover for opening the support structure to insert the coaxial cartridge via the first end face of the support structure and for closing the support structure for the duration of the pressing-out process;

wherein the side wall of the support structure comprises a cylindrical outer tube and an inner tube which is inserted into said outer tube and mounted in an axially shiftable manner therein wherein the inner tube widens conically on an inside toward the support structure front wall at the same cone gradient as the cartridge outer wall and has the same inner diameter on the support structure front wall as an outer diameter of the cartridge outer wall on the cartridge front wall; and wherein the support structure has an axial pressure device on a second end face that is designed to press the inner tube against the closed cover.

16. A system for stoning and dispensing a flowable multi-component composition, comprising:

a coaxial cartridge having a hollow-cylindrical cartridge inner wall, a cartridge outer wall which is arranged coaxially around said cartridge inner wall and is cylindrical at least on an inside, an inner chamber for a first component of the multi-component position that is delimited radially by the cartridge inner wall, and an outer chamber for a second component of the multi-component composition that lies radially between the cartridge inner wall and the cartridge outer wall, and a cartridge front wall which firmly closes the inner chamber and the outer chamber on an end face of the coaxial cartridge and has a dispensing opening in each of the inner chamber and the outer chamber; and a support structure which is designed to receive and hold the coaxial cartridge when the multi-component composition is pressed out of said coaxial cartridge, and for this purpose has a side wall which is shaped at least partly like a tube portion and is at least partly closed on a first end face by a support structure front wall designed to support the cartridge front wall;

wherein an inner diameter of the side wall is varied or can be adjusted in an axial and/or radial direction of the support structure in such a way that an annular gap between the cartridge outer wall and the side wall is created, or can be adjusted when the coaxial cartridge is inserted into and removed from the support structure, and a tight fit of the side wall against the cartridge outer wall is created or can be adjusted over the duration of a pressing-out process;

wherein the cartridge outer wall is cylindrical on an outside;

wherein the side wall of the support structure comprises: a cylindrical outer tube, a plurality of outer rings which are each mounted in said outer tube in an axially shiftable manner, each tapering in an axial cross section in a trapezoidal or triangular shape toward a cylinder axis and each resting with their broad sides against an inside of the outer tube, and a plurality of inner rings which are each arranged alternately with the outer rings in the axial direction, partly projecting radially between the outer rings and each widening in an axial cross section in a trapezoidal or triangular shape toward the cylinder axis;

wherein each inner ring has a plurality of radial incisions distributed over its circumference to change its diameter such that said inner ring can be pressed radially inward by axially pushing together adjacent outer rings and, as a result, the inner diameter of said inner ring can be reduced to be equal to the outer diameter of the cartridge outer wall so that said inner ring is pressed against the outer wall of the coaxial cartridge inserted in the support structure; and wherein the support structure has an axial pressure device on a second end face that is designed for axially pushing the outer rings together toward the support structure front wall.

* * * * *